June 12, 1923.
J. S. GRAHAM
VEHICLE SIGNAL
Filed July 1, 1921
1,458,819
2 Sheets-Sheet 1
Fig. 1.
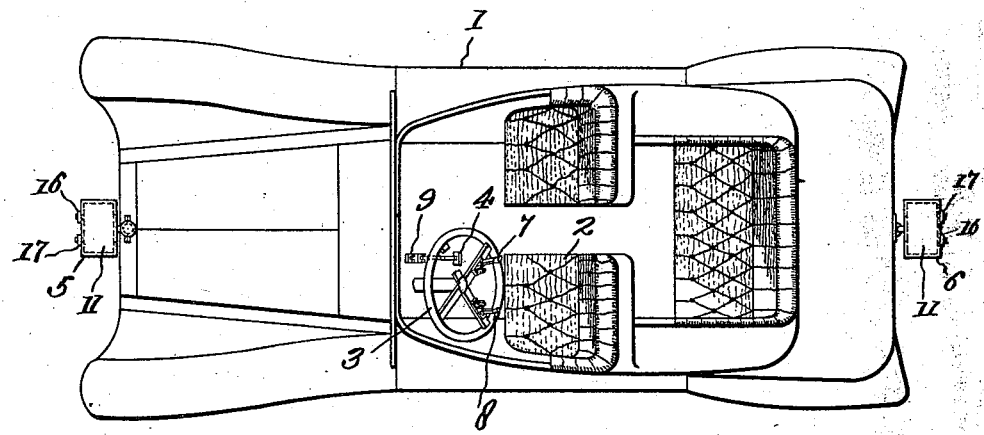
Fig. 6.
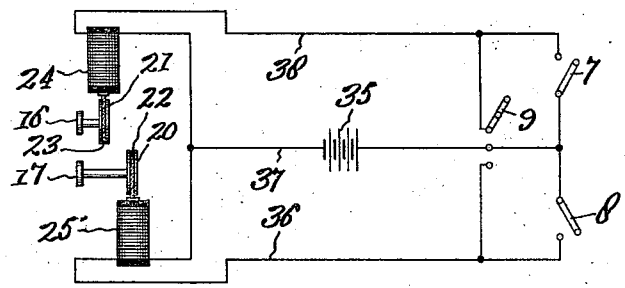
Fig. 7. Fig. 8. Fig. 9.
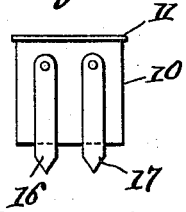 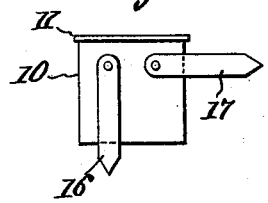 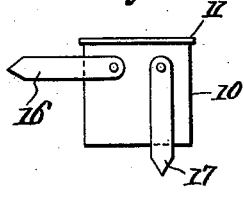
Fig. 10. Fig. 11.
Inventor
John S. Graham
by Wilkinson & Giusta
Attorneys June 12, 1923.
J. S. GRAHAM
1,458,819
VEHICLE SIGNAL
Filed July 1, 1921
2 Sheets-Sheet 2
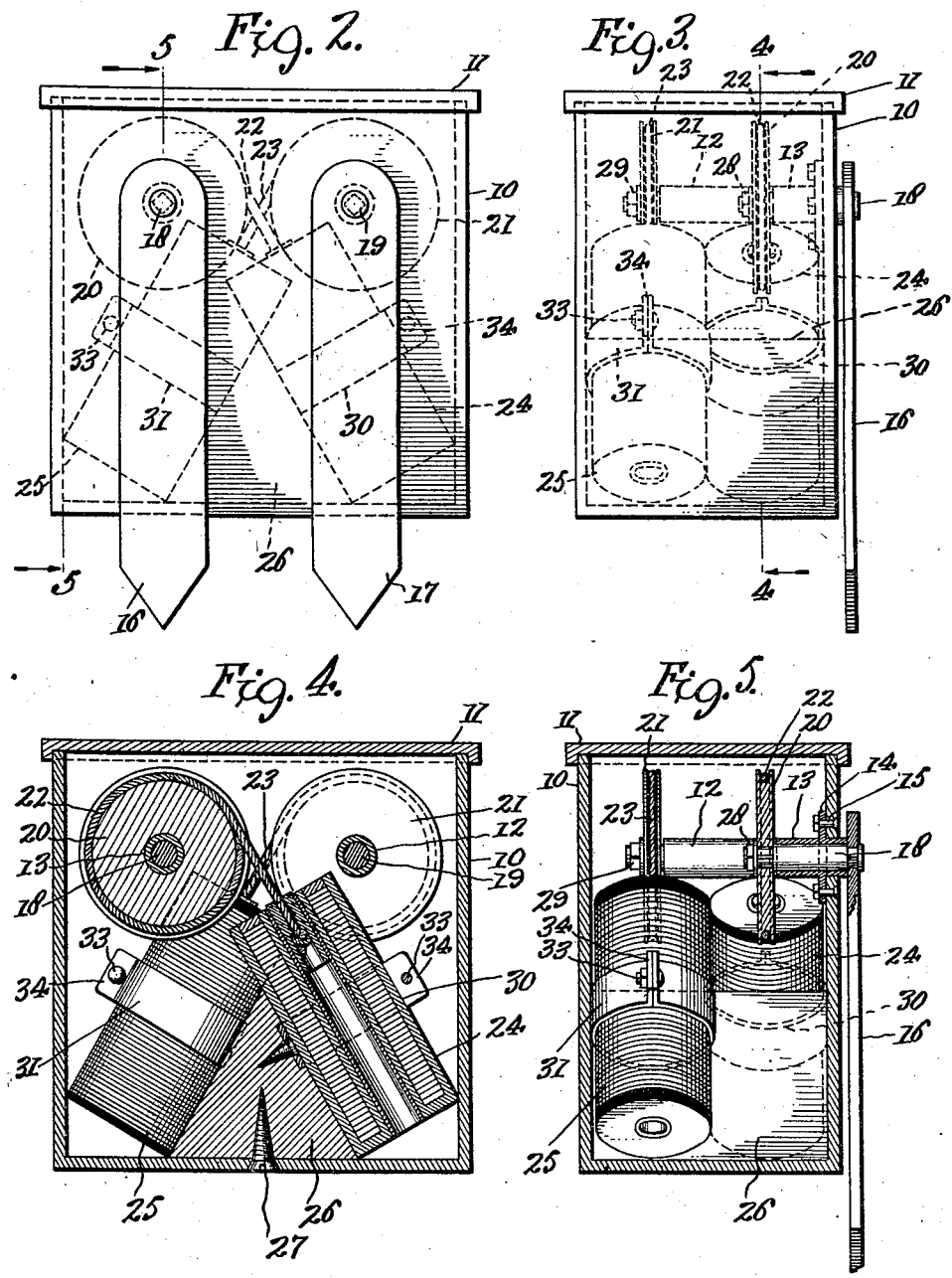
Inventor
John S. Graham
by Wilkinson & Giusta
Attorneys.

Patented June 12, 1923.

1,458,819

UNITED STATES PATENT OFFICE.

JOHN SISSON GRAHAM, OF THE UNITED STATES NAVY.

VEHICLE SIGNAL.

Application filed July 1, 1921. Serial No. 481,915.

*To all whom it may concern:*

Be it known that I, JOHN S. GRAHAM, commander, United States Navy, a citizen of the United States, residing at Johns Hill, Decatur, in the county of Macon and State of Illinois, have invented certain new and useful Improvements in Vehicle Signals; and I do hereby declare the following to be a full, clear, and exact description of the invention, such as will enable others skilled in the art to which it appertains to make and use the same.

The present invention relates to improvements in vehicle signals and has for an object to provide an improved direction signal for use in connection with vehicles to signify, and inform the drivers of approaching vehicles, pedestrians and traffic officers, proposed changes in direction more particularly at street intersections, and to announce a proposed intention to stop or to move rearwardly.

A great many signals have been heretofore proposed with this same object and idea in view, but so far as I am aware, none of them have been to any extent put into practical use. It is another object of this invention to provide a simple, inexpensive and economical direction signal for vehicles which has an exceedingly compact construction and which embodies a pair of semaphore arms which are constantly in full view even when in inoperative position and which together constitute the signal, such semaphore arms being actuated either singly or simultaneously by an operating unit in a casing on which the arms are held and which unit is adapted to be removed and replaced from and in the casing as a whole and involves the use of solenoids under switch control from the driver's seat of the vehicle.

With the foregoing and other objects in view, the invention will be more fully described hereinafter, and will be more particularly pointed out in the claims appended hereto.

In the drawings, wherein like symbols refer to like or corresponding parts throughout the several views, Fig. 1 is a top plan view of the vehicle with my improved signal mechanisms at both front and rear;

Fig. 2 is an enlarged view in front elevation of one of the signal mechanisms;

Fig. 3 is an end view of the same;

Fig. 4 is a longitudinal section view taken on a line 4—4 in Fig. 3;

Fig. 5 is a cross sectional view taken on a line 5—5 in Fig. 2;

Fig. 6 is a circuit diagram; and

Figs. 7 to 11 inclusive are diagrams showing the position of the semaphore arms in giving the several signals.

Referring more particularly to the drawings, 1 designates a vehicle having a driver's seat 2, a steering wheel 3 and a brake pedal 4. The improved signal mechanisms are applied in this instance to both the front and rear of the vehicle as represented broadly at 5 and 6 and knife switches 8 and 7 are carried by the left and right sectors of the steering wheel 3, while a normally open switch 9 is arranged to be closed by the brake pedal 4.

Referring more particularly to Figs. 2 to 5 inclusive, 10 designates a casing closed at it bottom and sides and being preferably of cubical form with an open top closed by the flanged cover 11 which may be secured to the casing 10 in any desired manner, but preferably in such wise that it may be quickly removed to give access to the interior.

Extending through the front wall of the casing 10 are a pair of bearing sleeves 12 and 13 having flanges 14 cast or otherwise formed thereon or attached thereto and lying inwardly of the front ends of the sleeves. These flanges 14 lie against the inside face of the front wall of the casing and are perforated to receive rivets or other suitable fastenings 15 by which the bearing sleeves are permanently or detachably secured in a firm manner to the casing wall.

It will be noted that the sleeve 12 is substantially twice as long as its companion 13 and projects to the opposite side of the casing. The sleeves 12 and 13 at their outer ends both project distinctly beyond the front face of the casing in order to hold the semaphore arms 16 and 17 away from active contact with the casing front and to provide a comparatively small yet effective annular bearing for the semaphore arms to turn upon. These arms 16 and 17 must be responsive in an easy and quick manner to the signal actuating means and for this purpose the small bearing surface afforded by the outer ends of the sleeves is of advantage as the bearing thus provided is annular and while covering a comparatively wide area of the arms does not come into actual contact with more than a small surface, and yet such bearing will hold the arms effectively in position even when subjected to rough usage incident to vehicle travel.

The arms 16 and 17 are preferably pointed as shown and otherwise made of an elongated construction preferably drooping down in their initial inoperative position as shown in Figs. 2 and 7, the lower pointed free ends of the arms extending considerably below the line of the bottom of the casing 10. The arms are riveted or otherwise fixed on a pair of shafts 18 and 19 which are preferably reduced for this purpose. The shafts are journaled in the sleeves 12 and 13 and are of length to correspond, both shafts projecting beyond the inner ends of the sleeves and having made fast thereon a pair of sheaves 20 and 21 which rotate in parallel offset planes in the casing. The sheaves 20 and 21 are grooved and receive cords 22 and 23. The cords at one end are secured to the sheaves as for instance by tacking or gluing. The other ends of the cords are attached to the reciprocating cores of a pair of solenoids 24 and 25.

A triangular block 26 has its base fitted upon the bottom of the casing and extends transversely thereon with its convergent sides receiving the solenoids 24 and 25 holding them in relatively inclined positions. A fastening screw 27 passes through a perforation in the bottom of the casing and is threaded into the block 26 and it forms a unitary fastening for the entire ensemble of the solenoids. By its removal the entire unit may be lifted out of the casing. In manufacturing, units are assembled externally and independently of the casing and are afterwards quickly placed therein and secured in the manner stated.

The sheaves 20 and 21 are removably held upon the shafts 18 and 19 as by nuts 28 and 29 so that prior to the removal of the solenoid assembly the nuts may be removed to permit the sheaves 18 and 19 to be drawn out from the sleeves 12 and 13. The fastenings 15 may then be removed and the sleeves lifted out through the top after lifting off the cover 11.

The solenoids 24 and 25 are preferably held upon the block 26 in the angular position shown in Fig. 4 by bands 30 and 31 secured at their intermediate portions to the block as by screws or appropriate securing means 32 and connected together by bolts 33 at their divided flanged ends 34. The use of this band makes it a simple matter to remove and replace the solenoids from the assembly.

Referring more particularly to Fig. 6, the solenoids 24 and 25 are shown to be included in separate circuits with the battery 35 or magneto circuit, for instance the storage battery of the vehicle. The solenoid 25 is included in a circuit 36, 37 adapted to be closed by the switch 8. The other solenoid 24 is included in a circuit 37, 38 closable by the other switch 7. The switch 9 is in parallel with the switches 7 and 8 and is adapted to close both circuits simultaneously. The switch 9 is preferably of the push button variety positioned for closing automatically by the brake pedal 4 or independently by the foot of the driver of the vehicle.

In use, the semaphore arms 16 and 17 normally present the appearance shown in Figs. 2 and 7 in which they seek a drooping attitude in front of the casing and in full view. In Fig. 8 the arm 17 is shown to be swung upwardly into a horizontal position. This, in conjunction with the arm 16 which remains in its initial position, indicates for instance that a turn to the right viewed from a following vehicle at a street intersection is proposed. This is accomplished for instance by closing the knife switch 7 on the right hand sector of the steering wheel 3. This energizes the solenoid 25, creating a pull upon the cord 23 and rotating the sheave 21 and the switch arm 17. The arm 17 will remain in a raised horizontal position until the knife switch 7 is again opened. The switch is preferably a knife switch so that it will remain permanently and effectively closed without regard to the jarring and vibration of the vehicle until being again positively opened. When opened the solenoid becomes de-energized and the arm 17 falls by gravity to its original position.

By closing the knife switch 8, the condition shown in Fig. 9 is arrived at with the semaphore arm 16 raised to indicate a proposed turn, viewed from a following vehicle, to the left. The arm 17 is not affected.

The closing of the switch 8 energizes the solenoid 24 which sucks in its core 39. This core is light in weight and of comparatively short length making it responsive in a quick easy way. A socket 40 is formed in the lower end of the core 39 to receive the knot on the end of the cord 22. The cord 22 is thus pulled upon and rotates the sheave 20 and the arm 16. The weight of the arm 16 compared to that of the core 39 is such that the arm will readily fall and lift the core to the original position as soon as the solenoid 24 is de-energized. The tilting position of the solenoids makes it easier to draw up the cores than would be the case were they arranged vertically; also more compact to assemble.

In Fig. 10 both arms 16 and 17 are raised which is accomplished by the application of the brakes through the pedal 4 or both knife switches. This indicates brakes are applied or a slowing down and warns following vehicles and approaching vehicles of the possible intention to stop.

In Fig. 11 the arms 16 and 17 are shown in a partially elevated position and in dotted lines in both initial and raised positions, which indicates that in case of emergency or in case of a sudden and unexpected stoppage, the arms may be waved up and down, accomplished by the foot of the driver directly upon the switch 9, to indicate going rearward.

In view of the foregoing, it will be appreciated that I have provided an improved signaling device for vehicles in which companion arms are constantly in view and are intended to be read in conjunction the one with the other to display a variety of direction and emergency signals and to announce the intention of the driver of his proposed change in direction or other course of conduct. The device may be mounted upon the rear of the vehicle as shown at 6 in Fig. 1 or it may be mounted at the front thereof as represented at 5, or both devices may be used together and suitable extension circuits made to include both with the same switch arrangement.

The front signal will show to pedestrians about to cross the street the intention of motorists, the signal mechanism being such that it does not require any reading of signal words or the like, but appeals equally well to illiterate persons and children as there can be no mistaking the pointing of the directions by the semaphore arms. If desired electric lamps or other illuminating means may be used in conjunction with the signaling device, but headlights of approaching cars will illuminate signals satisfactorily to motorists.

It is obvious that various changes and modifications may be made in the details of construction and design of the above specifically described embodiment of this invention with departing from the spirit thereof, such changes and modifications being restricted only by the scope of the following claims.

What is claimed is:

1. A vehicle signal comprising a casing closed at its bottom and sides and open at its top, a removable cover for the top, a pair of normally drooping signal arms lying on the outside of one of the casing walls and being spaced apart to opposite sides of the center thereof whereby to act conjointly in signaling, shafts for supporting and raising the signal arms in opposite directions, said shafts entering said casing and each having a sheave, the sheaves thereon disposed in separated planes, a flexible connection for each sheave, the connections being wound in opposite directions on the respective said sheaves, solenoids mounted in said casing in off-set relation and being inclined in opposite directions, means detachably held in the casing for removably holding the solenoids in a unitary assembly, and cores in the solenoids connected to the ends of said flexible connections.

2. A vehicle signal comprising a casing, a pair of sleeves projecting through a wall of the casing and lying within the casing with their inner ends disposed in remote planes, shafts rotatably mounted in the sleeves and projecting beyond the sleeves, signal arms upon the outer projecting ends of the shafts held against the ends of the sleeves and spaced by the sleeves from the wall of the casing, sheaves fixed upon the inner projecting ends of the shafts in spaced planes, a block detachably held in the casing having convergent sides, solenoids lying against the sides of the block and inclined in opposite directions toward the sheaves, reciprocating cores in the solenoids, and flexible connections wound about the sheaves, each of said connections having one end attached to a sheave and the other end affixed to the corresponding core.

3. A vehicle signal comprising a casing closed at its bottom and sides and open at its top, a removable cover for the top of the casing, a triangular block supported upon the bottom of the casing and having means to removably secure it thereto, a pair of solenoids lying in parallel planes against the upwardly converging sides of the block and being tilted toward one another, means removably carried by the sides of the block for affixing the solenoids thereto, relatively light cores in the solenoids, flexible connections each having one end attached to a core, sheaves receiving the other ends of the flexible connections respectively and being disposed in parallel planes, shafts carrying the sheaves projecting through a wall of the casing, sleeves removably mounted in the casing for rotatably supporting the shafts, and signal arms on the outer ends of the shafts bearing against the ends of the sheaves and spaced thereby from the wall of the casing.

JOHN SISSON GRAHAM.